Aug. 24, 1965  KARL-ALBERT ECKSTEIN  3,202,467
THIN-WALLED CAGES FOR CYLINDRICAL ROLLERS
Filed Oct. 27, 1964  2 Sheets-Sheet 1

INVENTOR

KARL-ALBERT ECKSTEIN

BY

Hammond + Littell

ATTORNEYS

Aug. 24, 1965    KARL-ALBERT ECKSTEIN    3,202,467
THIN-WALLED CAGES FOR CYLINDRICAL ROLLERS
Filed Oct. 27, 1964                         2 Sheets-Sheet 2
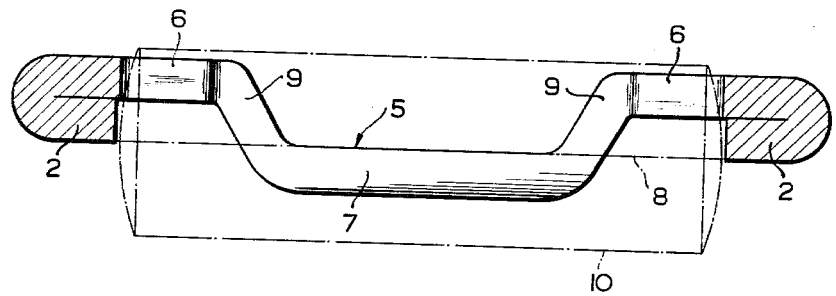
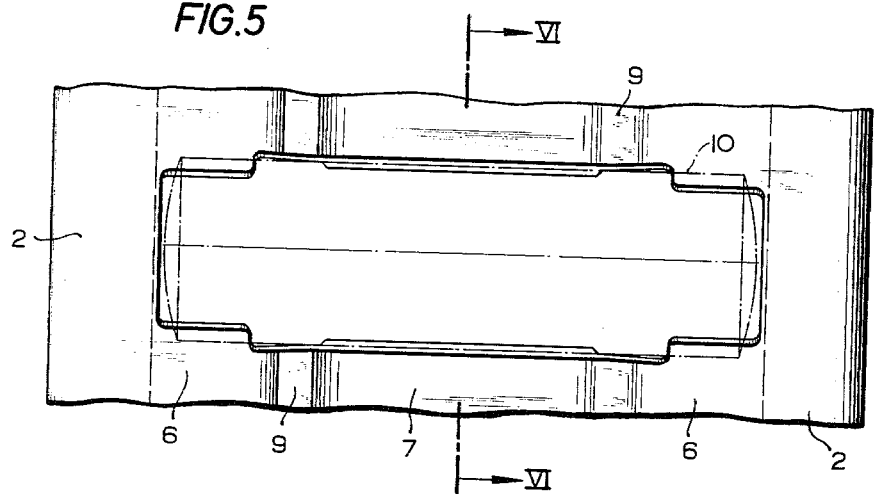
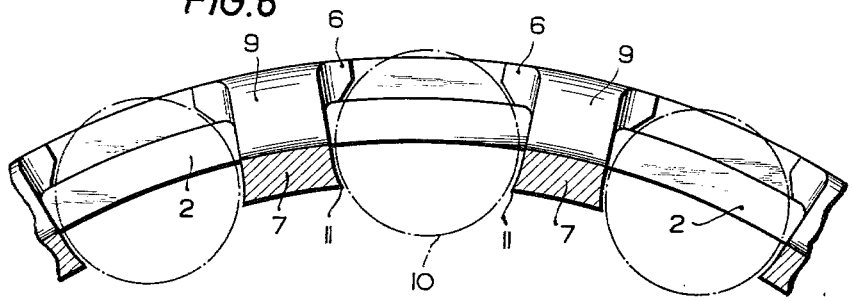
INVENTOR
KARL-ALBERT ECKSTEIN
BY
Hammond & Littell
ATTORNEYS United States Patent Office 3,202,467
Patented Aug. 24, 1965

3,202,467
THIN-WALLED CAGES FOR CYLINDRICAL ROLLERS
Karl-Albert Eckstein, Herzogenaurach, near Nurnberg, Germany, assignor to Industriewerk Schaeffler OHG, Herzogenaurach, Germany, a corporation of Germany
Filed Oct. 27, 1964, Ser. No. 406,864
Claims priority, application Germany, Nov. 2, 1963, J 24,668
5 Claims. (Cl. 308—217)

The invention relates to a novel cage for cylindrical rollers made of thin-walled material, particularly sheet metal, comprised of two annular rims connected together by profiled crossbars which bound the slots for accommodating the rollers and which guide and retain the rollers. The invention also relates to a novel method of producing the said cage from flat strips.

Cages of this type are already known in various constructional forms and these known cages have usually either been constructed from thin-walled tubes or drawn from circular sheet metal blanks. However, thin-walled cages of this type which are produced from a flat strip of sheet metal by rolling it to a cylindrical shape are also known. In the latter case, however, the connection of the abutting ends of the flat cage strip in the rolled cylindrical shape presents considerable difficulty. It is not practical to connect the abutting ends by welding, since the wall thickness of the material used is too thin for that purpose. One solution to this problem proposed in the case of cages manufactured in this way is to connect the ends of the annular rims by fitting U-section sheet metal rings additionally over the annular rims and connecting them thereto. These additional measures not only require additional expense for the manufacture of such cages, but also requires additional working operations which complicate manufacture. Another solution proposed in the case of such sheet metal cages which are produced from a flat sheet metal strip and rolled to a cylindrical shape, is not to fix the abutting ends to one another at all but to incline the joint gap so that it extends over several cage slots. When such a cage is provided with rollers, the ends of the cage are held together by the rollers introduced into the slots. This construction, however, involves the disadvantage that in the region of the cage slots through which the joint gap extends, satisfactory axially-parallel guiding of the rollers is no longer guaranteed.

It is an object of the invention to provide a novel thin-walled cage for cylindrical rollers produced from flat strips of thin-walled material.

It is another object of the invention to provide a novel economical method of producing thin-walled cages for cylindrical rollers from flat strips of thin-walled material.

These and other objects and advantages of the invention will become obvious from the following detailed description.

The novel thin-walled cage of the invention for cylindrical rollers is comprised of two annular rims connected together by profiled crossbars which bound the slots for accommodating the rollers and which guide and retain the rollers, the annular rims formed at both axial ends of the cage by folding over the cage ends and the abutting ends of the annular rims being connected to each other by welding after the originally flat strip has been bent to a circular form.

This construction achieves in a simple manner the result that, although the entire cage is made of thin-walled material, an adequate cross-section of material to permit the welding of the abutting ends of the annular rims is produced at the annular rims by the folding-over of the cage material. Thus, the invention provides a satisfactory solution to this problem without requiring any considerable additional outlay in order to achieve it and more particularly without impairing the operation of the cage in any way. The folding-over of the cage material at the annular rims is in fact to be regarded as an additional working operation but one which can be carried out in a very simple manner as the following description will show.

The method of the invention for the manufacture of thin-walled cages for cylindrical rollers comprises (a) folding-over both longitudinal edges of a blank of a flat, rectilinear sheet metal strip of uniform thickness to provide rims of double the sheet metal wall thickness, (b) punching slots for accommodating the rollers in the sheet metal strip between the rims, (c) offsetting the area of the sheet metal strip between the rims whereby the crossbars bounding the slots are provided with portions to guide and retain the rollers and (d) bending the flat sheet metal strip to form a cylindrical cage and welding the abutting ends of the rims. The offsetting operation can be performed before punching the slots if desired and the rims can be formed after the punching and/or the offsetting operations.

This method can be carried out in a particularly rational manner by passing the flat sheet metal strip through rolling apparatus whereby in a continuous working operation the necessary shaping without cutting can be carried out, and between the individual shaping stages or at the end of these stages the slots used for accommodating the rollers can be punched in successive steps. It will be clear that in this continuous working method it is not important whether the longitudinal edges of the sheet metal strip are or are not folded over by additional rolling apparatus at the beginning of the method. At any rate, practically no additional cost is involved by this step apart from the single expense of the tools.

Referring now to the drawings which illustrate various stages of one method of the invention to form the cage for cylindrical rollers:

FIG. 4 is an enlarged cross-sectional view through a slot in the finished processed sheet metal strip.

FIG. 5 is a partial plan view of the completed bent-round cage and

FIG. 6 is a cross-sectional view of the cage on line VI—VI of FIG. 5.

Figure 1:
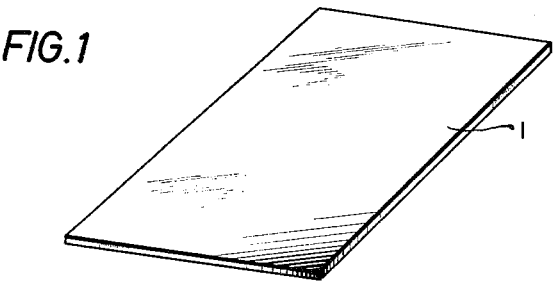
FIG. 1 is a plan view of a flat sheet metal blank in its initial state and FIG. 2 is a plan view of the sheet metal strip after the edges have been folded over to form the rims.
Figure 2:
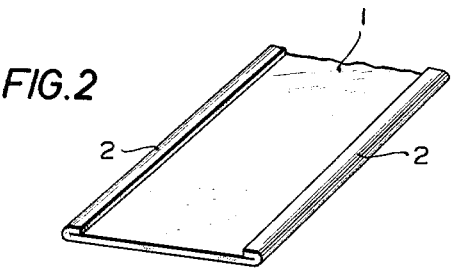
Figure 3:
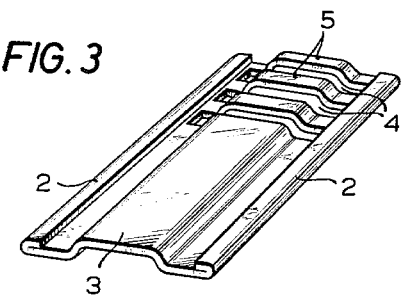
FIG. 3 is a plan view of the sheet metal strip after the offsetting of the central portion and partial punching of the slots.

The manufacture of the cage starts from a blank consisting of a flat, straight sheet metal strip 1 of uniform thickness, as shown in FIG. 1. In the first step of the method this sheet metal strip 1 is provided with rims 2 of double wall thickness along its two longitudinal edges by folding-over the edges as shown in FIG. 2. Then, as shown in FIG. 3, the region of the sheet metal strip 1 between the rims 2 is offset at its central region 3. Then, in the region of the sheet metal strip between the rims 3, cage slots 4 are punched so as to leave cage bars 5 bounding the slots.

FIG. 4 shows a cross-section through such a cage slot 4 after the sheet metal strip has been processed to this extent. FIGURE 4 also shows the folded-over rims 2 and the cage bars 5 which bound the slots and which in the regions 6 adjoining the rims 2 are situated at one side and in their central region 7 at the other side of the pitch circle 8 of the rollers. The bar portions 6 and 7 are connected to one an other by angled bar portions 9. With this bar construction, the rollers are retained by the bar portions 6 and 7, while the guiding of the rollers is effected partly by the bar portions 7 and partly by the bent-over portions 9 in the regions of the pitch circle 8. In FIG. 4, dot-dash lines indicate a roller 10.

All that is then required to finish the cage is to bend the sheet metal strip which has been prepared thus far to a cylindrical form and to connect the abutting ends to one another. FIG. 5 shows a plan view of a slot of a finished cage of this kind in which a roller 10 is indicated by means of dot-dash lines. This plan view shows that the bar portions 6 are made wider than the remaining bar portions to such an extent that in the finished cage they are spaced from one another at a distance which is less than the diameter of the roller diameter, with the result that the rollers cannot fall through in an outward direction. The internal retaining means for the rollers 10 comprises the bar portions 7, which portions are provided at their surface directed towards the rollers with, for example, a profiling which corresponds to the roller surface.

FIG. 6 shows, in a sectional view on the line VI—VI in FIGURE 5, in detail the circumstances which are important for retaining and guiding the rollers. It is shown, for example, that the inner edges 11 formed by the profiling of the bar portions 7 are also spaced from one another to an extent which is less than the diameter of the rollers 10.

It should also be pointed out that it is not important as far as the operation of the cage is connected, whether the central region 3 is offset only after the method step illustrated in FIG. 3 and then the cage slots 4 are punched in the cage, or whether these steps are carried out in the reverse order, and first of all the slots 4 are punched in the flat strip, whereafter the bars 5 are brought into an offset position. Both procedures are possible and are fully equivalent to one another.

Various modifications of the method of the invention may be made without departing from the spirit or scope thereof and it is to be understood that the invention is to be limited only as defined in the appended claims.

I claim:

1. A thin-walled cage for cylindrical rollers comprising two annular rims integrally connected together by profiled crossbars which bound the slots for accommodating the rollers and which guide and retain the rollers, the annular rims formed at both axial ends of the cage by folding over the cage ends to provide narrow rims of double the sheet metal wall thickness, the rim walls being parallel and closely adjacent to one another and the abutting ends of the annular rims being connected to each other by welding after the originally flat strip has been bent to a circular form.

2. A method of manufacturing thin-walled cages for cylindrical rollers comprising (a) folding over both longitudinal edges of a blank of a flat, rectilinear sheet metal strip of uniform thickness to provide rims of double the sheet metal wall thickness, (b) punching slots for accommodating the rollers in the sheet metal strip between the rims, (c) offsetting the area of the sheet metal strip between the rims whereby the crossbars bounding the slots are provided with portions to guide and retain the rollers and (d) bending the flat sheet metal strip to form a cylindrical cage and welding the abutting ends of the rims.

3. A method of manufacturing thin-walled cages for cylindrical rollers comprising (a) folding over both longitudinal edges of a blank of a flat rectilinear sheet metal strip of uniform thickness to provide rims of double the sheet metal thickness, (b) offsetting the central area of the sheet metal strip between the rims, (c) punching slots for accommodating the rollers in the sheet metal strip between the rims whereby the crossbars bounding the slots are provided with portions to guide and retain the rollers and (d) bending the flat sheet metal strip to form a cylindrical cage and welding the abuttting ends of the rims.

4. The method of claim 2 wherein the rims are formed on the sheet metal strip after the punching and offsetting steps.

5. The method of claim 2 wherein the rims are formed on the sheet metel strip after the offsetting and punching steps.

References Cited by the Examiner

UNITED STATES PATENTS

| | | | |
|---|---|---|---|
| 1,173,719 | 2/16 | Hirth | 308—217 |
| 2,120,154 | 6/38 | Schildgen et al. | 308—201 |
| 2,848,791 | 8/58 | Neese | 29—148.4 |
| 3,173,192 | 3/65 | Smith | 29—148.4 |

WHITMORE A. WILTZ, *Primary Examiner.*